Figure 1:
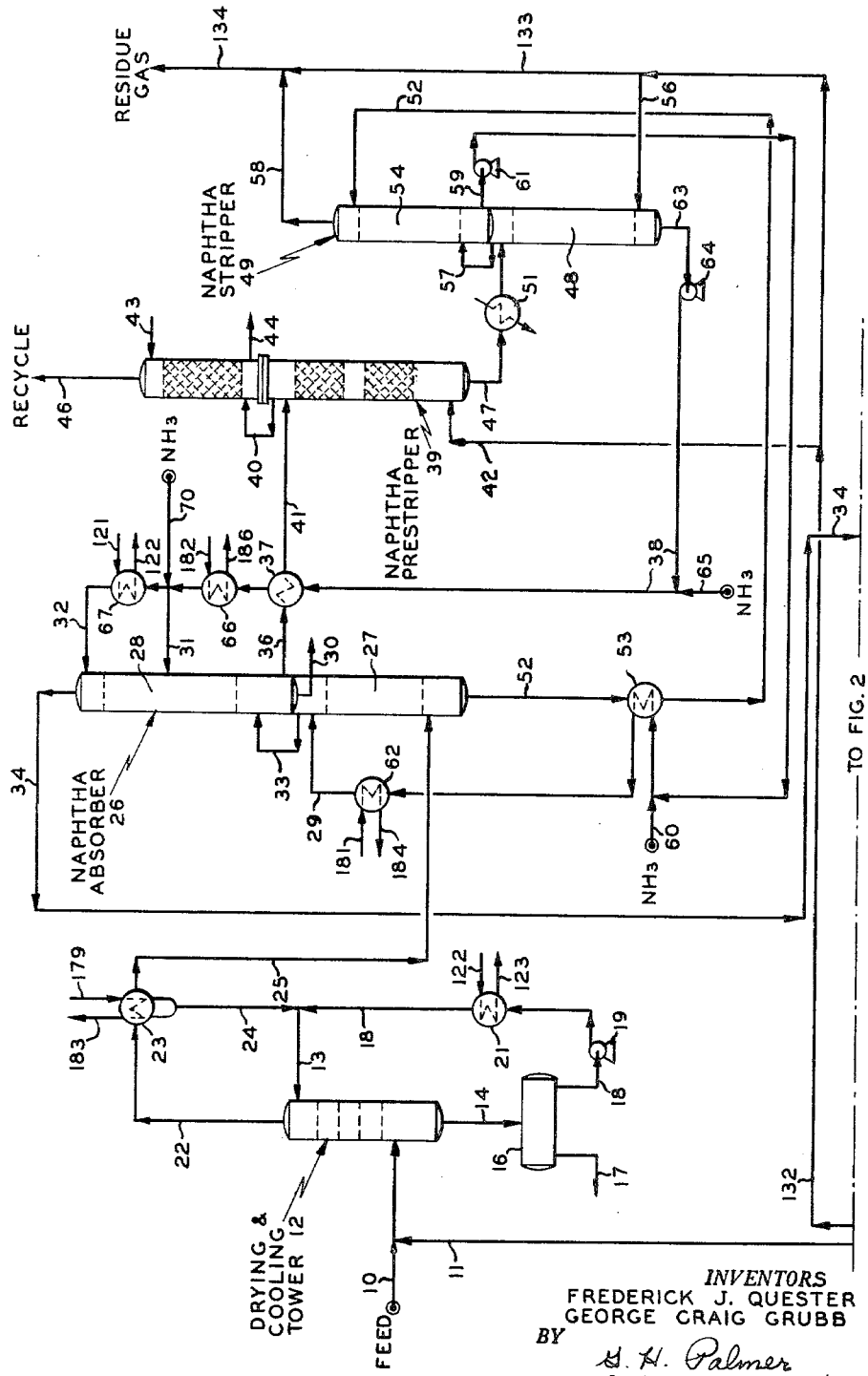

Aug. 10, 1965  F. J. QUESTER ETAL  3,199,266
ACETYLENE PURIFICATION
Filed March 17, 1961  2 Sheets-Sheet 1

INVENTORS
FREDERICK J. QUESTER
GEORGE CRAIG GRUBB
BY
G. H. Palmer
John C. Quinlan
ATTORNEYS

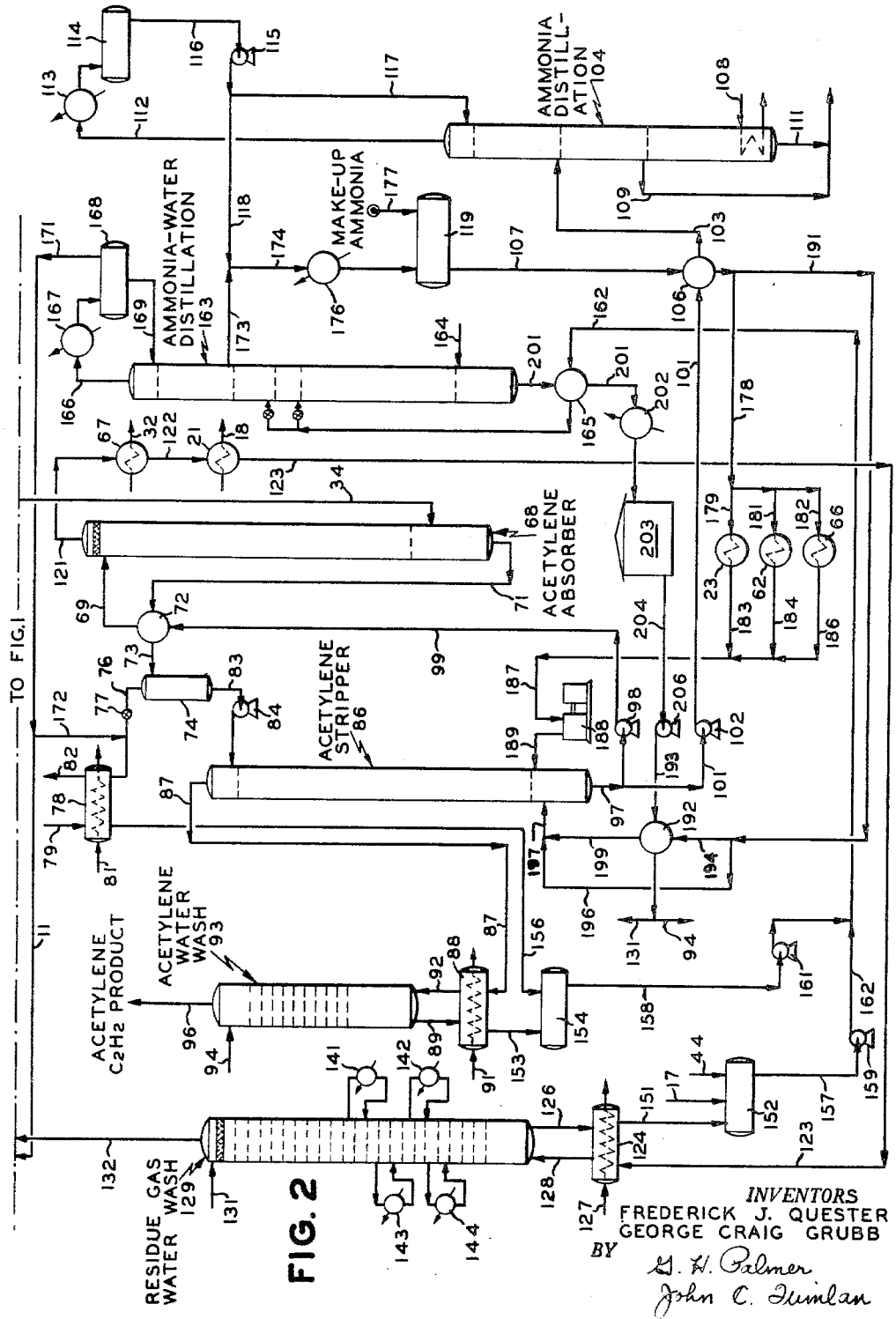

United States Patent Office 3,199,266
Patented Aug. 10, 1965

3,199,266
ACETYLENE PURIFICATION
Frederick J. Quester, New York, N.Y., and George Craig Grubb, Eatontown, N.J., assignors to Pullman Incorporated, a corporation of Delaware
Filed Mar. 17, 1961, Ser. No. 96,603
14 Claims. (Cl. 55—43)

The present invention relates to an improved method for separating acetylene from a gaseous mixture containing acetylene and other gases such as carbon monoxide and hydrogen. In one of its more particular aspects, this invention relates to an improved method for desorbing acetylene absorbed in liquid ammonia.

A number of processes for the separation of acetylene from gas mixtures are available. Generally these processes involve the selective absorption of acetylene in a suitable absorbent. The acetylene-rich absorbent is then separated from the unabsorbed gases in the absorption zone after which the acetylene is recovered. A number of absorbents have been proposed for this separation, one of the most efficient being liquid ammonia. Liquid ammonia, in addition to its high selectivity for acetylene, has the advantage that it is used at relatively low temperatures which are preferred for handling acetylene and that it is also autorefrigerating. Where liquid ammonia is used as the acetylene absorbent, the rich liquid is passed to a stripping zone from which an overhead fraction containing acetylene and ammonia is recovered. The stripping vapors required to desorb the acetylene are normally generated by indirect heat exchange between the liquid ammonia in the lower portion of the stripping zone and extraneous hot water or steam. The overhead vapors from the stripping zone are then water-washed in one or more washing zones to recover the ammonia for reuse and to produce substantially pure acetylene. Because the absorption of ammonia in water is accompanied by the evolution of a large amount of heat, due to the high heat of solution of ammonia, complicated procedures involving a large number of heat exchangers have been developed in order to remove the heat released in the water-washing step.

It is an object of this invention to provide an improved process for separating acetylene from a gas mixture.

It is another object of the invention to recover acetylene from a gas mixture containing acetylene, other normally gaseous hydrocarbons, carbon oxides and hydrogen.

Still another object of the invention is to provide an improved process for recovering acetylene absorbed in liquid ammonia.

Yet another object of the invention is to improve the thermal efficiency of a process for recovering acetylene from a gas mixture.

A further object of the invention is to prepare substantially pure acetylene.

Various other objects and advantages of the invention will become apparent from the following detailed discussion and description.

According to the present invention, acetylene absorbed in liquid ammonia is stripped therefrom in a stripping zone maintained at a pressure between about 5 p.s.i.g. and about 310 p.s.i.g. by evaporating substantially impurity-free liquid ammonia in indirect heat exchange with a warmer fluid and introducing the resulting ammonia vapor into the stripping zone to provide stripping gases. In a preferred method of operation, the substantially impurity-free liquid ammonia which is evaporated is a recycle stream obtained in subsequent ammonia recovery operations and its evaporation is conducted in indirect heat exchange with another, relatively warm process stream which is thereby advantageously cooled for its use in the process.

A principal commercial process for the preparation of acetylene involves the pyrolysis of low boiling hydrocarbon feed stocks, i.e., light hydrocarbons ranging from normally gaseous hydrocarbons through light naphthas. In the pyrolysis process, the hydrocarbon feed is maintained under closely controlled conditions of temperature, pressure and reaction time to provide a gas mixture containing a recoverable quantity of acetylene. As indicated, the process is applicable to the conversion of normally gaseous hydrocarbons as well as normally liquid hydrocarbons. In the conversion of normally gaseous hydrocarbons the feed material is preheated and combined with a quantity of oxygen in an amount sufficient to oxidize a portion of the hydrocarbon feed. This oxidation reaction supplies the bulk of the heat necessary for the conversion of the hydrocarbons to desired products. For the conversion of normally liquid hydrocarbons to acetylene, a suitable combustion gas, such as hydrogen or mixtures of hydrogen with carbon oxides, and hydrocarbon is burned with oxygen under conditions conducive to complete oxidation of the combustion gas. The liquid hydrocarbon feed, preferably preheated, is injected into the hot combustion gases. Preheating of the liquid hydrocarbon feed should be kept substantially below reaction temperatures in order to avoid premature reaction.

Pyrolytic conversion of hydrocarbons is an endothermic reaction and the distribution of the pyrolysis reaction products is determined to a significant extent by the reaction temperature and the reaction time in addition to the feed composition. Pressure also influences product distribution. As a general rule, high temperatures combined with short reaction times favor the production of acetylene whereas lower temperatures and longer reaction times favor the production of ethylene. Conditions most favorable for the production of acetylene involve reaction temperatures between about 1500° C. and about 3000° C. with a reaction time between about 0.001 and about 0.01 second. Unfortunately, conditions most favorable for the production of acetylene also tend to favor the production of acetylene homologues such as methyl acetylene, vinyl acetylene, diacetylene, etc., various other $C_1$–$C_6$ hydrocarbons, hydrogen, carbon monoxide and carbon dioxide. The commercial use of acetylene as a chemical intermediate as, for example, in the preparation of chlorinated ethylenes, acetic acid, vinyl chloride, vinyl acetate, neoprene, chloroprene, and acrylonitrile, requires acetylene of extremely high purity, necessitating substantially complete removal of all of the foregoing materials from the pyrolysis effluent. Prior to the selective absorption of acetylene referred to hereinabove, it is necessary to effect a prepurification of the acetylene-containing gases to remove hydrocarbons higher boiling than acetylene including acetylene homologues. The prepurification process must be carefully selected to avoid the hazards of explosion and polymerization to which the unstable acetylene homologues are prone, particularly in the case of diacetylene which can only be handled in dilute concentrations.

In carrying out the process of this invention, the crude acetylene-containing gas produced by the pyrolysis of a hydrocarbon is first treated to remove carbon, tar and carbon dioxide which are formed during the reaction. After this preliminary treatment the acetylene-containing gas is cooled by contact with a solvent having a suitably low freezing point such as heavy naphtha, acetone, methanol, ethanol, etc. A preferred solvent is heavy naphtha because it is also preferably used as the subsequent prepurification solvent and use of the same solvent for both purposes eliminates the need for separate solvent recovery systems. Water formed during the reaction and picked up during the preliminary purification steps is condensed by the cooling and is separated. After contact with the solvent the gas, which is completely saturated with solvent, is further cooled, solvent and water which condense are separated and the chilled gas is passed to a naphtha absorption zone.

In the naphtha absorption zone the acetylene-containing gas is contacted with a heavy naphtha having a boiling range between about 300° F. and about 500° F. The boiling range of the naphtha is an important factor since too low boiling a fraction would result in the voltalization and loss of the absorbent during subsequent stripping operation thereby contaminating product streams while too high boiling a fraction would complicate the separation of acetylene homologues from the absorbent. The naphtha absorber preferably contains two superposed absorption zones to the lower of which is introduced a relatively small naphtha stream to absorb the more readily soluble heavier hydrocarbons and to the upper of which is introduced a relatively large naphtha stream to absorb the more difficultly soluble acetylene homologues. Thus, the acetylene-containing gas passes in countercurrent contact first with the small naphtha stream in the lower absorption zone and then with the large naphtha stream in the upper absorption zone. When the process is carried out in this fashion, the lower absorption zone is operated at a temperature between about −30° F. and about 10° F., preferably about −15° F. to about 0° F., and the upper absorption zone is operated at a temperature between about −50° F. and about 10° F., preferably about −15° F. to about 0° F. Low temperatures are preferred because of the tendency of acetylene homologues to polymerize at high temperatures and because smaller amounts of circulating absorbent are required at lower temperatures thereby reducing equipment sizes. Pressure in the naphtha absorber and each of its zones is maintained between about 25 p.s.i.g. and about 260 p.s.i.g. The average $L/V$ ratio (mols of liquid naphtha per mol of gas) is maintained between about 0.01 and about 0.06, preferably about 0.045 to about 0.050 in the lower absorption zone and between about 0.09 and about 0.65, preferably about 0.36 to about 0.50 in the upper absorption zone.

Because of the relatively large quantity of naphtha circulating through the upper absorption zone some acetylene and ethylene are absorbed. In order to recover the absorbed acetylene, the rich absorbent from the upper absorption zone is passed to a naphtha prestripping zone where it is contacted with a stripping gas, preferably a product gas, to remove absorbed acetylene and ethylene. The term product gas, as used herein, means any of the pyrolysis gases such as hydrogen, methane, ethane, carbon monoxide, carbon dioxide and steam, singly or in admixture. Best results are obtained by employing a stripping gas consisting of components of lower molecular weight than the components being stripped. An inert gas such as nitrogen can be used as stripping gas in place of product gas, although there is no particular advantage in such substitution and in fact the use of inert gas is in many instances detrimental since a foreign component, which in some cases must be subsequently removed, is introduced into various product streams. In order to increase the efficiency of the process, the stripped acetylene and ethylene is recycled and combined with feed gas. The naphtha prestripping zone is maintained at a temperature between about 50° F. and about 90° F., a pressure between about 17 p.s.i.a. and about 30 p.s.i.a. and an average $V/L$ ratio (mols of stripping gas per mol of liquid naphtha) between about 0.01 and about 0.10. Under these conditions, substantially all of the absorbed acetylene are stripped from the large rich naphtha stream.

The naphtha absorbent free of acetylene but containing acetylene homologues is withdrawn from the prestripping zone and introduced into the lower stripping zone of a naphtha stripper. The small rich naphtha stream from the lower absorption zone of the naphtha absorber, containing substantially no acetylene or ethylene and therefore not requiring prestripping, is delivered to the upper stripping zone of the naphtha stripper. The stripping operation is carried out with a product gas supplied to the lower portion of the lower stripping zone which after desorbing the more difficultly soluble acetylene homologues contained in the relatively large rich naphtha stream in the lower stripping zone then passes through the upper stripping zone to desorb the more readily soluble acetylene homologues and heavier hydrocarbons contained in the relatively small rich naphtha stream. The lower stripping zone is maintained at a temperature of about 60° F. to about 150° F., preferably about 95° F. to about 105° F., and a pressure of about 35 p.s.i.a to about 50 p.s.i.a. and the upper stripping zone is maintained at a temperature of about 40° F. to about 100° F., preferably about 50° F. to about 100° F., and a pressure of about 35 p.s.i.a. to about 50 p.s.i.a. Average $V/L$ ratios in the lower stripping zone are between about 0.83 and about 1.2, preferably about 0.95 to about 1.05, and in the upper stripping zone between about 6.7 and about 10.5, preferably about 7.7 to about 8.5. Substantially all of the acetylene homologues together with other absorbed gases are desorbed from the two naphtha streams in the naphtha stripper so that these two streams can be recycled after cooling as more fully described below for further use in the naphtha absorber.

As a result of the prepurification accomplished in the naphtha absorption zone, a gas rich in acetylene, hydrogen, carbon monoxide and normally gaseous hydrocarbons, such as ethylene and methane, is obtained as an overhead product therefrom. Acetylene is separated from this gas mixture by absorption in liquid ammonia. For this purpose the acetylene-containing gas is introduced into an acetylene absorption zone where it is contacted with an ammonia. The acetylene absorber operates at a temperature between about −100° F. and about 25° F., preferably about −70° F. to about −15° F., and a pressure between about 40 p.s.i.g. and about 250 p.s.i.g., preferably about 40 p.s.i.g. to about 125 p.s.i.g. As a result of the low temperature prepurification, the acetylene-containing gas is already substantially cooled and is introduced without further cooling into the acetylene absorber at a temperature preferably between about 10° F. and about 30° F. above absorber temperature in order to maintain autorefrigeration conditions whereby some of the liquid ammonia absorbent is vaporized in the absorber.

In the acetylene absorption zone, acetylene is preferentially absorbed together with a minor amount of other pyrolysis gases in the liquid ammonia. Unabsorbed gases are withdrawn from the acetylene absorber, treated to recover ammonia vapor in an ammonia absorption zone maintained at a temperature between about 40° F. and about 150° F. and a pressure of about 35 p.s.i.g. to about 245 p.s.i.g. and in part used as stripping gases in the naphtha prestripping zone and naphtha stripper and in part discharged from the system. The enriched ammonia absorbent is withdrawn from the acetylene absorption zone and introduced into a separation zone maintained at a temperature between about −70° F. and about 125° F. and a pressure between about 5 p.s.i.g. and about 325 p.s.i.g. from which a gas stream containing substantially all absorbed nonacetylenic pyrolysis gases, such as ethylene, hydrogen and carbon monoxide, together with a small amount of acetylene is removed. Because of the larger proportion of ethylene in the rich ammonia absorbent when a normally liquid hydrocarbon is pyrolyzed as opposed to a normally gaseous hydrocarbon, it is preferred to supply some stripping gas to the separation zone in the former case. In either case, the overhead gas stream from the separation zone contains a large amount of ammonia. Hence, in the preferred operation of the process of this invention, this gas stream is recycled and combined with the acetylene-containing feed gas after ammonia removal. Recycling of this stream increases the overall efficiency of the process since the acetylene contained therein is recovered.

Ammonia absorbent containing acetylene and substantially free of other gases is recovered in the separation zone as a liquid phase and is passed to an acetylene stripping zone to desorb and recover the absorbed acetylene. This stripping zone is maintained at a temperature between about −15° F. and about 125° F., preferably about −15° F. to about 26° F., and a pressure between about 5 p.s.i.g. and about 310 p.s.i.g., preferably about 10 p.s.i.g. to about 40 p.s.i.g. Lower pressures and correspondingly lower temperatures are preferred because of the explosion hazards of high-pressure concentrated acetylene and the costly safety provisions required therefor, because the required amount of stripping gases is reduced, and because the thermal efficiency of the process is enhanced by heat recovery at lower levels and the reduced temperature difference between the acetylene absorber and the acetylene stripper. Under the indicated conditions of operation, substantially all of the acetylene, together with some ammonia vapor, is removed from the acetylene stripping zone and contacted with water in an ammonia absorption zone maintained at a temperature between about 40° F. and about 150° F. and a pressure between 0 p.s.i.g. and about 50 p.s.i.g. to absorb the ammonia vapor. Substantially pure acetylene is withdrawn from the ammonia absorption zone and recovered as product.

Lean ammonia is withdrawn from the acetylene stripping zone and recycled to the acetylene absorption zone. This bottoms fraction contains some water and hydrocarbon impurities, so that to prevent the build-up of heavy impurities and water in the ammonia recycle stream, between about 10 and about 30 percent of the lean ammonia absorbent is withdrawn and treated preferably in a first fractionation zone maintained at a temperature between about 80° F. and about 150° F. and a pressure between about 150 p.s.i.g. and about 310 p.s.i.g. Substantially impurity-free ammonia is removed overhead and recycled to the acetylene stripping zone after use as a source of refrigeration as more fully described below.

As indicated previously, the unabsorbed gases from the acetylene absorption zone and the acetylene stream from the acetylene stripping zone each contain considerable quantities of ammonia vapor. These gas streams are, therefore, separately treated in similar ammonia absorption zones where the ammonia vapor is absorbed in water. Water from these two zones, which contains dissolved ammonia, is combined and treated to recover dissolved ammonia in a second fractionation zone maintained at a temperature between about 80° F. and about 425° F. and a pressure between about 150 p.s.i.g. and about 310 p.s.i.g. A substantially impurity-free ammonia fraction is recovered from the second fractionation zone and is recycled to the acetylene stripping zone also after use as a source of refrigeration as more fully described below.

In the preferred method of operation of the invention, substantially impurity-free liquid ammonia recovered directly as liquid or as a vapor thereafter condensed from the first and second fractionation zones is combined and a part thereof is expanded and evaporated at a pressure lower than that maintained in the acetylene stripping zone in indirect heat exchange with warmer fluids in the prepurification system to provide the necessary cooling duty for its advantageous low-temperature operation. Thus, it is preferred to cool each of the lean naphtha streams recirculated to the naphtha absorption zone and the crude acetylene-containing gas prior to its introduction into the naphtha absorption zone by indirect heat exchange with expanded liquid anhydrous ammonia. The ammonia thus evaporated is compressed to at least the pressure of the acetylene stripping zone and is passed directly thereto to provide stripping gases.

Another part of the liquid anhydrous ammonia recovered from the fractionation zones is expanded and at least partially vaporized by indirect heat exchange with water recovered from the second fractionation zone. The partially vaporized ammonia is passed to the acetylene stripping zone to provide additional stripping gases and the cooled water is recirculated to the ammonia absorption zones for reuse in dissolving ammonia. Such cooling of the water recirculated to the ammonia absorption zones appreciably decreases the cooling requirements of these zones, permitting reduction or elimination of the several external cooling means otherwise required to maintain low temperatures in the ammonia absorption zones. By these integrated heat exchange steps, the need for a standard reboiler with the acetylene stripping zone is obviated and the heat source for the acetylene stripping zone coacts as a source of refrigeration in the naphtha prepurification system and the ammonia recovery system.

Each of the ammonia absorption zones is operated in several stages in order to facilitate removal of the large amount of heat evolved. Precooling of the water introduced to these absorption zones reduces the heat removal requirement appreciably, as mentioned above, but does not eliminate it entirely where efficient separation of ammonia is practiced. Thus, the ammonia-containing gas is introduced initially into at least one liquid phase absorption stage and then into a dispersed phase absorption stage. In the liquid phase absorption stage the ammonia-containing gas is contacted with water which absorbs a portion of the ammonia vapor. The heat evolved by the absorption is removed by indirect heat exchange means position within the liquid phase absorption stage of the ammonia absorption zone. After treatment in the liquid-phase absorption stage, the gas, containing a reduced quantity of ammonia, is passed to the dispersed phase absorption stage. Dispersion of water in the dispersed phase absorption stage is obtained by any convenient means, such as sprays or trays. Preferably trays are employed. Since heat is evolved in the dispersed phase absorption stage, suitable external cooling means can be provided to remove heat. Flow through the ammonia absorption zone is countercurrent. Thus, the cooled water absorbent is introduced at the top of the dispersed phase absorption stage and flows in countercurrent contact with the upflowing gas stream. Water from the bottom of the dispersed phase absorption stage is introduced into the liquid phase absorption stage for countercurrent contact with ammonia-containing gas. The absorbent water withdrawn from the liquid phase absorption stage, therefore, contains substantially all of the ammonia introduced into the ammonia absorption zone.

For a specific example of a preferred embodiment of the invention, reference is had to the accompanying drawings which show diagrammatically an acetylene purification unit. FIGURE 1 shows the first part of the process and FIGURE 2 shows the second part of the process. Referring to the drawings, about 4533.4 mols per hour of a gas stream containing acetylene obtained by the pyrolysis of natural gas and treated for the removal of carbon, tar and carbon dioxide is introduced through line 10 at a temperature of 95° F. and a pressure of 57 p.s.i.g. This gas has the composition given below in Table I.

TABLE I

*Feed gas composition, mols per hour*

| | |
|---|---|
| $H_2$ | 2589.9 |
| $N_2$ | 41.0 |
| $CO$ | 1171.2 |
| $CO_2$ | 0.4 |
| $CH_4$ | 222.4 |
| $C_2H_2$ | 381.4 |
| $C_2H_4$ | 21.6 |
| $C_3H_4$ [1] | 3.5 |
| $C_3H_4$ [2] | 1.9 |
| $C_3H_6$ | 0.5 |
| $C_4H_2$ | 9.4 |
| $C_4H_4$ | 4.3 |
| $C_4H_6$ | 0.5 |
| $C_6H_6$ | 3.6 |
| $H_2O$ | 60.0 |
| $NH_3$ | 21.8 |
| | 4533.4 |

[1] Methyl acetylene.
[2] Propadiene.

The gas stream in line 10 flows to the lower portion of a drying and cooling tower 12. In the process of this example, the gas is cooled by countercurrent contact with a cold heavy naphtha stream introduced through line 13 at a rate of about 110,161 pounds per hour. A bottoms liquid fraction containing naphtha and ammonia-water is withdrawn from tower 12 at 85° F. through line 14 and permitted to separate into hydrocarbon and ammonia-water phases in separation drum 16 from which the ammonia-water solution is continuously withdrawn at a rate of about 129 gallons per hour through line 17. The hydrocarbon phase is recirculated to tower 12 in lines 18 and 13 by pump 19 after cooling to 28° F. by indirect heat exchange in exchanger 21. The pyrolysis gas saturated with naphtha is withdrawn from tower 12 through line 22 at a temperature of 31° F. and a pressure of 56 p.s.i.g. The naphtha-saturated gas stream flowing in line 22 passes through heat exchanger 23 where its temperature is lowered to −10° F. As a result of this cooling, about 161 pounds per hour of naphtha and ammonia-water are condensed in exchanger 23 and returned to tower 12 through line 24.

Ice formation in tower 12 and exchanger 23 is prevented by the presence of ammonia which dissolves in the water condensed as a result of cooling. The ammonia content of the feed gas in line 10 is ordinarily adequate not only to prevent freezing in tower 12 and exchanger 23 but to supply part of the ammonia antifreeze requirement in the subsequent process steps. However, the ammonia content of the feed gas in line 10 is subject to some fluctuation creating from time to time conditions under which ice can form. Provision is therefore made to introduce an ammonia-rich stream through line 11 into the feed gas in line 10 so that the ammonia content of the gas entering tower 12 is always maintained at adequate levels and interruption of the process due to icing is precluded.

The chilled acetylene-containing gas from exchanger 23 passes in line 25 to a naphtha absorption column 26 which is operated at a bottom temperature of −2° F. and a pressure of 53 p.s.i.g. and a top temperature of −36° F. and a pressure of 48 p.s.i.g. Absorption column 26 is provided with a lower absorption zone 27 and an upper absorption zone 28 which are interconnected only for the upward passage of gas by line 33. Approximately 30,217 pounds per hour of heavy naphtha are introduced into the top of the lower absorption zone 27 (average $L/V=0.047$) through line 29 as discussed more fully below. Approximately 239,432 pounds per hour of heavy naphtha are introduced into the top of upper absorption zone 28 (average $L/V=0.38$) through lines 31 and 32, also as discussed more fully below. The cooled and dried acetylene-containing gas, introduced into the bottom of naphtha absorption column 26 through line 25, passes countercurrently with the smaller naphtha stream in the lower absorption zone 27, thence through line 33 to the upper absorption zone 28 and then countercurrently with the larger naphtha stream in the upper absorption zone 28, from which approximately 4423.2 mols per hour of acetylene-containing gas substantially free of acetylene homologues are withdrawn as an overhead fraction in line 34. The composition of this prepurified gas is given below in Table II.

TABLE II

*Prepurified gas composition, mols per hour*

| | |
|---|---|
| $H_2$ | 2588.2 |
| $N_2$ | 41.0 |
| $CO$ | 1171.3 |
| $CO_2$ | 0.4 |
| $CH_4$ | 221.6 |
| $C_2H_2$ | 364.6 |
| $C_2H_4$ | 20.5 |
| $C_3H_4$ [1] | 1.1 |
| $C_3H_4$ [2] | 0.3 |
| $C_3H_6$ | 0.2 |
| $C_4H_2$ | 0.1 |
| $C_4H_4$ | nil |
| $C_4H_6$ | nil |
| $C_6H_6$ | nil |
| $H_2O$ | 0.2 |
| $NH_3$ | 13.7 |
| | 4423.2 |

[1] Methyl acetylene.
[2] Propadiene.

Approximately 240,730 pounds per hour of rich naphtha absorbent containing absorbed acetylene homologues and some acetylene and ethylene are withdrawn from the bottom of upper absorption zone 28 through line 36 at a temperature of −7° F. This bottoms stream is heated to 70° F. in exchanger 37 by indirect heat exchange with recirculating lean naphtha flowing in line 38. The heated rich naphtha stream is passed from exchanger 37 to the lower section of a naphtha prestripping column 39 through line 41. The upper and lower sections of prestripper 39 are interconnected only for the upward passage of gas through line 40. The lower section of prestripper 39 operates at a bottom temperature of 69° F. and a pressure of 8 p.s.i.g. and a top temperature of 69° F. and a pressure of 5 p.s.i.g. In prestripper 39 the rich naphtha absorbent is stripped in the lower section by countercurrent contact with about 38.0 mols per hour of product gas (average $V/L=0.021$) at 60° F. which is introduced into the bottom of prestripper 39 through line 42. The product gas used to provide stripping gases is obtained as described below. Water at 100° F. is introduced into the upper section of the prestripper through line 43 and withdrawn therefrom through line 44 at 103° F. so as to reabsorb small amounts of ammonia stripped together with the acetylene and ethylene from the rich naphtha stream in the lower section of the prestripper by product gases. Thus, the overhead recovered from prestripper 39 at a temperature of 100° F. in line 46 contains substantially only acetylene, ethylene and product gases which are recycled to the feed gas at a rate of about 61.4 mols per hour. As a result of prestripping, losses of acetylene from the process incident to absorption in upper absorption zone 28 of the naphtha absorber 26 are significantly reduced.

Approximately 240,141 pounds per hour of naphtha absorbent containing absorbed acetylene homologues but substantially free of acetylene and ethylene are withdrawn from the bottom of naphtha prestripping column 39 through line 47 and are delivered to the top of lower stripping zone 48 in naphtha stripping column 49 after being heated to 100° F. by indirect heat exchange with hot water in heat exchanger 51. About 30,698 pounds per hour of rich naphtha absorbent are withdrawn from the bottom of the lower absorption zone 27 of naphtha absorption column 26 in line 52 and are delivered to the top of upper stripping zone 54 in naphtha stripping column 49 after being heated to 52° F. by indirect heat exchange with recirculating lean naphtha in heat exchanger 53. Approximately 1678.6 mols per hour of product gas at a temperature of 60° F. are introduced into the lower portion of lower stripping zone 48 through line 56 to provide requisite stripping gases for naphtha stripping column 49. Stripping gases flow in countercurrent contact with the large rich naphtha stream in lower stripping zone 48 to desorb acetylene homologues (average $V/L=1.0$), then pass to the lower portion of upper stripping zone 54 through line 57 and flow in countercurrent contact with the small rich naphtha stream in upper stripping zone 54 to desorb heavier hydrocarbons (average $V/L=8.1$), whereby substantially all of the absorbed acetylene homologues and heavier hydrocarbons absorbed in the two naphtha streams are stripped and recovered in the overhead fraction withdrawn from naphtha stripping column 49 through line 58 at a rate of about 1705.7 mols per hour. The stripped gases in line 58 are at a temperature of 70° F. and a pressure of 22 p.s.i.g.

A regenerated naphtha stream is recovered from the bottom of upper stripping zone 54 at 76° F. in line 59. This stream is recirculated at a rate of about 30,217 pounds per hour to the upper portion of lower absorption zone 27 in naphtha absorption column 26 through lines 59 and 29 by pump 61 after being cooled in exchanger 53 to 22° F. by rich naphtha flowing in line 52 after being further cooled in exchanger 62 to −10° F. A second regenerated naphtha stream is withdrawn from the bottom of lower stripping zone 48 of naphtha stripping column 49 at 94° F. and 25 p.s.i.g. in line 63. This lean naphtha stream is delivered by pump 64 through line 38 to heat exchanger 37 in which it is chilled to 20° F. by indirect heat exchange with cold rich naptha absorbent flowing in lines 36 and 41. From exchanger 37 the lean naphtha stream passes to exchanger 66 in which it is cooled to −10° F. Approximately 177,347 pounds per hour of the −10° F. lean naphtha is passed in conduit 31 from exchanger 66 to a point near the top of the upper absorption zone 38 of naphtha absorption column 26. The balance of the −10° F. lean naphtha is further cooled in heat exchanger 67 to −40° F. by indirect heat exchange with a residue gas described more fully below. This −40° F. lean naphtha then passes in line 32 at a rate of about 62,085 pounds per hour to the top of upper absorption zone 28 of naphtha absorption column 26. A portion of the recirculating lean naphtha is further chilled in this manner in order to reduce the temperature of the prepurified gas withdrawn through line 34 from the upper absorption zone 28 consistent with the subsequent treatment of the prepurified gas with cold liquid ammonia. Since the upflowing gas in absorption zone 28 contains some water vapor and vaporized absorbent, cooling to −36° F. in the top portion thereof causes substantially all of these materials to be condensed. An ammonia-water phase is permitted to separate in the lower portion of absorption zone 28 and is withdrawn therefrom through line 30.

The recirculating naptha stream in line 38 contains small amounts of water picked up in the upper absorption zone by virtue of the cooling and condensing there done. To prevent the freezing of this water and of that in the upper absorption zone, about 20 pounds per hour of ammonia are injected through line 65 into the relatively large recirculating lean naphtha stream in line 38 upstream from exchanger 37 and about 4 pounds per hour of ammonia are injected through line 70 into the portion of the relatively large recirculating lean naphtha stream cooled to −40° F. in exchanger 67 and thereafter flowing in line 32, upstream from exchanger 67. The relatively small recirculating lean naphtha stream in line 59 is normally water-free so that ammonia antifreeze need not be injected. However, under some circumstances, such as start-up, some water is present and provision is made to inject ammonia into line 59 through line 60 upstream from exchanger 53.

In each of the foregoing circulating systems, a virgin naphtha is used having a boiling range of 311° F. to 435° F. (ASTM Distillation), a specific gravity of 48.0° API and a Watson K factor of 11.95.

The acetylene-containing gas substantially free of acetylene homologues and heavier hydrocarbons recovered in line 34 from the naphtha absorption column 26 is passed to the lower portion of an acetylene absorber 68 in which it is countercurrently contacted with liquid anhydrous ammonia entering the top of absorber 68 through line 69 at the rate of about 96,696 pounds per hour. Acetylene absorber 68 operates at a bottom temperature of −68° F. and pressure of 46 p.s.i.g., a top temperature of −55° F. and pressure of 42 p.s.i.g. and an average $L/V$ of 1.24. Approximately 96,980 pounds per hour of ammonia absorbent enriched with acetylene and a small amount of other hydrocarbons including ethylene is withdrawn from the bottom of absorber 68 through line 71 and heated to a temperature of −14° F. by indirect heat exchange with lean ammonia absorbent in heat exchanger 72. The thus heated stream flows through line 73 to a flash separation drum 74 maintained at −15° F. and 14 p.s.i.g.. Absorbed non-acetylenic gases, including some acetylene, together with ammonia vapor separate as a vapor fraction in drum 74, are withdrawn through line 76 with valve 77 and pass to absorber-cooler 78. Water is introduced to absorber-cooler 78 via line 79 so that the ammonia contained in the flash gas is absorbed. The heat of solution evolved by absorption of the ammonia in water in absorber-cooler 78 is removed by circulating water through a cooling coil 81 disposed within absorber-cooler 78. The unabsorbed gases principally containing acetylene and ethylene are withdrawn from absorber-cooler 78 through line 82 at a rate of about 8.1 mols per hour and recirculated to the feed gas after suitable compression by means not shown.

Approximately 96,638 pounds per hour of enriched ammonia absorbent, substantially free of non-acetylenic materials, is withdrawn as the liquid phase from drum 74 through line 83 and passed by pump 84 to an acetylene stripper 86, operated at a bottom temperature of 6° F. and a pressure of 20 p.s.i.g. and a top temperature of −12° F. and a pressure of 15 p.s.i.g. An overhead stream containing acetylene and ammonia vapor is withdrawn from stripper 86 through line 87 at the rate of about 1486.2 mols per hour and is passed to an absorber-cooler 88 which constitutes the first or liquid phase stage of ammonia absorption. The gas entering absorber-cooler 88 is contacted with water containing dissolved ammonia introduced through line 89. The temperature in absorber-cooler 88 is maintained at about 100° F. by flowing relatively cold water through an indirect heat exchange coil 91 positioned within absorber-cooler 88. Acetylene containing a reduced quantity of ammonia is withdrawn from absorber-cooler 88 through line 92 and introduced into scrubber 93 where it is countercurrently contacted with about 51,500 pounds per hour of recycle water introduced through line 94 at 58° F. Scrubber 93 constitutes the second or dispersed phase stage of ammonia absorption and is operated at a top temperature of 58° F. and a pressure of 9 p.s.i.g. and a bottom temperature of 110° F. and a pressure of 11 p.s.i.g.. Approximately 356.7 mols per hour of acetylene saturated with water withdrawn from the top of scrubber 93 through line 96. The acetylene is dried, by means not shown, yielding an acteylene product of 99.5 mol percent purity.

Stripped ammonia is withdrawn from the bottom of acetylene stripper 86 at a rate of about 116,296 pounds per hour in line 97. Approximately 96,696 pounds per hour of this stripped ammonia from line 97 is recirculated to acetylene absorber 68 for reuse in the absorption of acetylene by pump 98 and lines 99 and 69. The recirculated ammonia absorbent is cooled from 6° F. to −49° F. by indirect heat exchange with cold enriched ammonia in heat exchanger 72. To prevent the build-up of water and hydrocarbon impurities in the circulating ammonia absorbent, approximately 19,600 pounds per hour of the stripped ammonia is withdrawn from line 97 via line 101, and is passed by pump 102 through lines 101 and 103, to an ammonia distillation column 104. Prior to its introduction into column 104 the stripped ammonia stream in line 101 is heated to 87° F. by indirect heat exchange in exchanger 106 with relatively warm liquid ammonia flowing in line 107. Ammonia distillation column 104 operates at a bottom temperature of 126° F. and a pressure of 275 p.s.i.g. and a top temperature of 117° F. and a pressure of 273 p.s.i.g. Heat for reboiling the fractionator is provided by indirect heat exchange between liquid in the lower portion of the fractionator and hot water shown flowing through line 108. Approximately 300 pounds per hour of a water-rich fraction is withdrawn from column 104 through lines 109 and 111 and is delivered from the process. The overhead from column 104 which is substantially pure ammonia is withdrawn in line 112, condensed in exchanger 113 by indirect heat exchange with cooling water and accumulated in drum 114. A portion of the condensed overhead is returned from drum 114 through lines 116 and 117 to the top of column 104 as reflux. The balance of the overhead condensate, or about 19,300 pounds per hour, passes through lines 116, 118 and 174 to an anhydrous ammonia storage drum 119.

Approximately 4598.5 mols per hour of residue gases, including appreciable quantities of ammonia, are withdrawn as the overhead fraction of acetylene absorber 68 in line 121. This gas stream which is available at −55° F. is first heated to −32° F. by indirect heat exchange with recirculating lean naphtha in heat exchanger 67. The partly warmed residue gas after use in exchanger 67 is passed in line 122 to heat exchanger 21 in which it is further heated to 70° F. by indirect heat exchange with recirculating naphtha used in conjunction with drying and cooling tower 12. The relatively warm residue gas from which substantial refrigeration has been recovered is withdrawn from exchanger 21 through line 123 and passes to absorber-cooler 124 which constitutes the first or liquid phase stage of an ammonia absorption sequence similar to the previously described sequence for water-washing the acetylene product. The gas entering absorber-cooler 124 is contacted with water containing dissolved ammonia introduced through line 126. The temperature in absorber-cooler 124 is maintained at about 94° F. by flowing relatively cold water through an indirect heat exchange coil 127 positioned within absorber-cooler 124. The residue gas containing a reduced quantity of ammonia is withdraw from absorber-cooler 124 through line 128 and is introduced into scrubber 129. The gases entering scrubber 129 are countercurrently contacted with about 65,000 pounds per hour of recycle water at 58° F. introduced through line 131. Scrubber 129 constitutes the second or dispersed phase stage of ammonia absorption and is operated at a top temperature of 58° F. and a pressure of 35 p.s.i.g. and a bottom temperature of 110° F. and a pressure of 38 p.s.i.g. Evolved heat is removed by inter-stage cooling in exchangers 141, 142, 143 and 144 with cooling water. The residue gas withdrawn through line 132 from scrubber 129 at the rate of about 43,799 pounds per hour is substantially ammonia free. As previously mentioned, a portion of the residue gas from the scrubber 129 is passed in line 42 to provide stripping gases for the naphtha prestripping column 39 and another portion is passed through line 56 to provide stripping gases to naphtha stripping column 49. The balance of the residue gases passing in line 133 are combined in line 134 with the overhead gases in line 58 from naphtha stripping colunm 49. The gas in line 134 has the composition given below in Table III.

TABLE III

| | Mols per hour |
|---|---|
| $H_2$ | 2564.4 |
| $N_2+CO$ | 1197.8 |
| $CO_2$ | 0.4 |
| $CH_4$ | 218.6 |
| $C_2H_2$ | 9.6 |
| $C_2H_4$ | 20.2 |
| $C_3H_4$ [1] | 2.4 |
| $C_3H_4$ [2] | 1.6 |
| $C_3H_6$ | 0.5 |
| $C_4H_2$ | 9.1 |
| $C_4H_4$ | 4.1 |
| $C_4H_6$ | 0.5 |
| $C_6H_6$ | 3.6 |
| $C_8$ | 0.4 |
| $C_9$ | 0.5 |
| $C_{10}$ | 0.5 |
| $NH_3$ | 5.6 |
| $H_2O$ | 19.0 |
| | 4059.6 |

[1] Methyl acetylene.
[2] Propadiene.

Water containing dissolved ammonia is withdrawn from absorber-cooler 124 in line 151 and passes to an atmospheric surge drum 152 maintained at 94° F. Approximately 608 gallons per hour of water containing dissolved ammonia is also recovered as previously indicated from naphtha prestripping column 39 in line 44 and this water is also passed to drum 152. Ammonia-water solution withdrawn from drum 16 through line 17 is similarly accumulated in drum 152. Water containing dissolved ammonia is recovered from absorber-cooler 88 in line 153 and is delivered to a surge drum 154 maintained at a temperature of 100° F. and 3 p.s.i.g. Approximately 475 gallons per hour of water containing dissolved ammonia is also introduced to drum 154 through line 156 from absorber-cooler 78. The ammonia-water solutions in drums 152 and 154 are withdrawn in lines 157 and 158 and passed by pumps 159 and 161, respectively, through common line 162 leading into an ammonia-water distillation column 163. Prior to its introduction into column 163, the combined stream is heated to 331° F. by indirect heat exchange in exchanger 165 with hot water bottoms from column 163. Ammonia-water distillation column 163 is maintained at a bottom temperature of 420° F. and a pressure of 298 p.s.i.g. and a top temperature of 117° F. and a pressure of 290 p.s.i.g. Approximately 34,800 pounds per hour of steam at 750° F. is introduced directly into the lower portion of column 163 through line 164 to provide reboiling vapors. An ammonia-rich fraction is recovered overhead from column 163 in line 166, partially condensed by indirect heat exchange with cooling water in exchanger 167 and is permitted to separate into liquid and vapor phases in drum 168. The liquid phase separated in drum 168 is returned to column 163 through line 169 as reflux. The vapor phase is withdrawn from drum 168 at a rate of 32.3 mols per hour, consisting of 30.0 mols per hour of ammonia and the balance acetylene, through line 171 and passed normally through line 172 to absorber-cooler 78. Under certain circumstances, this stream is passed to drying and cooling tower 12 as previously mentioned through line 11. Such recycle of the uncondensed fraction from drum 168 through line 171 serves to provide ammonia for antifreeze purposes in drying and cooling tower 12 and the naphtha prepurification system and to recycle the small amounts of acetylene carried over into column 163. Substantially pure acetylene-free ammonia is withdrawn from column 163 at a point above the feed point in line 173. This liquid ammonia, withdrawn at the rate of about 28,630 pounds per hour at 118° F., is combined with that in line 113 from column 104. The combined stream flowing in line 174 is cooled by indirect heat exchange with cooling water in exchanger 176 to 100° F. and flows to anhydrous ammonia storage drum 119. Approximately 215 pounds per hour of make-up ammonia are also introduced into drum 119 through line 177 to compensate for losses in the circulating ammonia system.

The liquid ammonia in drum 119 is withdrawn in line 107 and subcooled to 67° F. by indirect heat exchange with stripped ammonia in exchanger 106. Approximately 12,000 pounds per hour of the subcooled ammonia is passed in line 178 to heat exchangers in the naphtha drying and cooling and prepurification systems to provide refrigeration. Thus, about 3,610 pounds per hour of ammonia pass in line 179 to heat exchanger 23 and after expansion to 2 p.s.i.g. are evaporated at —23° F. in indirect heat exchange with the overhead from tower 12 in line 22. About 930 pounds per hour pass in line 181 to heat exchanger 62 and after expansion to 2 p.s.i.g. are evaporated at —23° F. in indirect heat exchange with recirculating lean naphtha in line 29. The balance, or about 7,460 pounds per hour, pass in line 182 to heat exchanger 66 and after expansion to 2 p.s.i.g. is evaporated at —23° F. in indirect heat exchange with recirculating lean naphtha in line 38. The ammonia thus evaporated is recovered in lines 183, 184, and 185 from exchangers 23, 62 and 66, respectively. The vaporous ammonia passes in line 187 to a compressor 188 by which it is compressed to a pressure of 22 p.s.i.g. and thereby heated to a temperature of 106° F. The compressed ammonia vapors are directly introduced into the lower portion of acetylene stripper 86 through line 189 to provide stripping gases. A further portion of the subcooled liquid anhydrous ammonia from exchanger 106 passes in lines 191 and 194 to a heat exchanger 192 where after expansion to 50 p.s.i.g., it is partially vaporized at a temperature of 35° F. by indirect heat exchange in exchanger 192 with water flowing in line 193. The partially vaporized ammonia from exchanger 192, together with liquid ammonia bypassing exchanger 192 through line 196, is introduced into the lower portion of acetylene stripper 86 through line 197 at an aggregate rate of about 36,145 pounds per hour to provide additional stripping gases.

Water, substantially free of ammonia, is recovered as a bottom fraction from ammonia-water distillation column 163 through line 201 at a rate of about 157,701 pounds per hour. This hot water is cooled in exchanger 165 to 149° F. by indirect heat exchange with cold ammonia-water solution and is further cooled to 100° F. by indirect heat exchange with cooling water in exchanger 202 from which it passes to water storage tank 203. Water is withdrawn from storage tank 203 through line 204 and is passed by pump 206 at a rate of about 116,500 pounds per hour to heat exchanger 192 in which it is cooled to 58° F. by evaporating ammonia. As previously mentioned, part of the cold water from exchanger 192 is recycled in line 94 to scrubber 93 and the remaining portion of the cold water from exchanger 192 is recycled through line 131 to scrubber 129.

Various modifications and alterations of the process of this invention will be apparent to those skilled in the art and may be used without departing from the scope of the invention.

We claim:

1. A process for desorbing acetylene absorbed in liquid ammonia in a stripping zone from which a bottoms fraction containing ammonia and water is withdrawn and treated in a distillation zone to recover an overhead liquid ammonia stream which comprises vaporizing at least a portion of said overhead liquid ammonia stream in indirect heat exchange with a warmer fluid and introducing ammonia thus vaporized into said stripping zone as stripping vapors.

2. A process for recovering acetylene from its solution in liquid ammonia which comprises contacting said solution with ammonia stripping vapors obtained as described below in a stripping zone, contacting overhead vapors from said stripping zone containing acetylene and ammonia with water in an ammonia absorption zone to scrub out ammonia, treating bottoms from said absorption zone containing ammonia and water in a distillation zone to recover a liquid ammonia stream, vaporizing at least a portion of said liquid ammonia stream from said distillation zone in indirect heat exchange with a warmer fluid and introducing ammonia thus vaporized into said stripping zone as stripping vapors.

3. A process for recovering acetylene from a mixture of gases containing acetylene, carbon oxides and hydrogen which comprises contacting said gas mixture with liquid ammonia in an absorption zone to selectively absorb acetylene, contacting bottoms from said absorption zone containing ammonia and acetylene with ammonia stripping vapors obtained as described below in a stripping zone to desorb acetylene, contacting overhead fraction from said absorption zone containing ammonia, carbon oxides and hydrogen with water in a scrubbing zone to scrub out ammonia, treating bottoms from said scrubbing zone containing ammonia and water in a distillation zone to recover a liquid ammonia stream, vaporizing at least a portion of said liquid ammonia stream from said distillation zone in indirect heat exchange with a warmer fluid and introducing ammonia thus vaporized into said stripping zone as stripping vapors.

4. A process for recovering acetylene from a mixture of gases containing acetylene, acetylene homologues, carbon oxides and hydrogen which comprises contacting said gas mixture with cold heavy naphtha in a first absorption zone to absorb acetylene homologues from said mixture, contacting overhead fraction from said first absorption zone containing acetylene, carbon oxides and hydrogen with liquid ammonia in a second absorption zone to selectively absorb acetylene, contacting bottoms fraction from said second absorption zone containing ammonia and acetylene with ammonia stripping vapors obtained as described below in a stripping zone to desorb acetylene, vaporizing substantially impurity-free liquid ammonia in indirect heat exchange with said heavy naphtha prior to its introduction into said first absorption zone whereby said heavy naphtha is cooled and introducing ammonia thus vaporized into said stripping zone as stripping vapors.

5. A process for separating acetylene from a mixture of gases containing acetylene, acetylene homologues, carbon oxides and hydrogen which comprises cooling said gas mixture, contacting said cooled gas mixture with cold heavy naphtha in a first absorption zone to absorb acetylene homologues from said mixture, contacting overhead fraction from said first absorption zone containing acetylene, carbon oxides and hydrogen with liquid ammonia in a second absorption zone to selectively absorb acetylene, contacting bottoms fraction from said second absorption zone containing ammonia and acetylene with ammonia stripping vapors obtained as described below in a stripping zone to desorb acetylene, vaporizing substantially impurity-free liquid ammonia in indirect heat exchange with said gas mixture to accomplish the aforesaid cooling thereof and introducing ammonia thus vaporized into said stripping zone as stripping vapors.

6. A process for recovering acetylene from its solution in liquid ammonia which comprises contacting said solution with ammonia stripping vapors obtained as described below in a stripping zone, contacting overhead vapors from said stripping zone containing acetylene and ammonia with cold water in a scrubbing zone to scrub out ammonia, vaporizing substantially impurity-free liquid ammonia in indirect heat exchange with a relatively warm water stream whereby said water stream is cooled, introducing ammonia thus vaporized into said stripping zone as stripping vapors and passing said cooled water to said scrubbing zone.

7. A process for recovering acetylene from a mixture of gases containing acetylene, carbon oxides and hydrogen which comprises contacting said gas mixture with liquid ammonia in an absorption zone to selectively absorb acetylene, contacting bottoms from said absorption zone containing ammonia and acetylene with ammonia stripping vapors obtained as described below in a stripping zone to desorb acetylene, contacting overhead fraction from said absorption zone containing ammonia, carbon oxides and hydrogen with cold water in a scrubbing zone to scrub out ammonia, vaporizing substantially impurity-free liquid ammonia in indirect heat exchange with a relatively warm water stream whereby said water stream is cooled, introducing ammonia thus vaporized into said stripping zone as stripping vapors and passing said cooled water to said scrubbing zone.

8. A process for recovering acetylene from its solution in liquid ammonia which comprises contacting said solution with ammonia stripping vapors obtained as described below in a stripping zone maintained at a pressure between about 5 p.s.i.g. and about 310 p.s.i.g., contacting overhead vapors from said stripping zone containing acetylene and ammonia with cold water in a scrubbing zone to scrub out ammonia, treating bottoms from said scrubbing zone containing ammonia and water in a distillation zone to recover a liquid ammonia stream and a warm water stream, passing at least a portion of said liquid ammonia stream from said distillation zone in indirect heat exchange with at least a portion of said water stream from said distillation zone whereby the liquid ammonia is at least partially vaporized and the water is cooled, introducing ammonia thus vaporized into said stripping zone as stripping vapors and passing said cooled water to said scrubbing zone.

9. A process for separating acetylene from a mixture of gases containing acetylene, acetylene homologues, carbon oxides and hydrogen which comprises contacting said gas mixture with cold heavy naphtha in a first absorption zone to absorb acetylene homologues from said mixture, contacting overhead fraction from said first absorption zone containing acetylene, carbon oxides and hydrogen with liquid ammonia in a second absorption zone to selectively absorb acetylene, contacting bottoms fraction from said second absorption zone, containing ammonia and acetylene with ammonia stripping vapors obtained as described below in a stripping zone maintained at a pressure of about 5 p.s.i.g. to about 310 p.s.i.g. to desorb acetylene, contacting overhead fraction from said stripping zone containing ammonia and acetylene with water in a scrubbing zone to scrub out ammonia, treating bottoms from said scrubbing zone containing ammonia and water in a distillation zone to recover a liquid ammonia stream, vaporizing at least a portion of said liquid ammonia stream from said distillation zone at a pressure lower than that maintained in said stripping zone in indirect heat exchange with said heavy naphtha prior to its introduction into said first absorption zone whereby said heavy naphtha is cooled, compressing ammonia thus vaporized to a pressure at least equal to said pressure maintained in said stripping zone and introducing the compressed ammonia into said stripping zone as stripping vapors.

10. A process for recovering acetylene from a mixture of gases containing acetylene, acetylene homologues, carbon oxides and hydrogen which comprises contacting said gas mixture with cold heavy naphtha in a first absorption zone to absorb acetylene homologues from said mixture, contacting overhead fraction from said first absorption zone containing acetylene, carbon oxides and hydrogen with liquid ammonia in a second absorption zone to selectively absorb acetylene, contacting bottoms fraction from said second absorption zone containing ammonia and acetylene with ammonia stripping vapors obtained as described below in a stripping zone maintained at a pressure of about 5 p.s.i.g. to about 310 p.s.i.g. to desorb acetylene, contacting overhead fraction from said stripping zone containing ammonia and acetylene with cold water in a scrubbing zone to scrub out ammonia, treating bottoms from said scrubbing zone containing ammonia and water in a distillation zone to recover a liquid ammonia stream and a warm water steam, vaporizing a portion of said liquid ammonia stream from said distillation zone at a pressure lower than that maintained in said stripping zone in indirect heat exchange with said heavy naphtha prior to its introduction into said first absorption zone whereby said heavy naphtha is cooled, compressing ammonia thus vaporized to a pressure at least equal to said pressure maintained in said stripping zone, introducing the compressed ammonia into said stripping zone to provide a portion of said ammonia stripping vapors, vaporizing another portion of said liquid ammonia stream from said distillation zone at a pressure higher than that maintained in said stripping zone in indirect heat exchange with at least a portion of said water stream from said distillation zone whereby the water is cooled, passing the ammonia from the last-mentioned heat exchange step to said stripping zone to provide another portion of said stripping vapors and passing said cooled water to said scrubbing zone.

11. A process for separating acetylene from a mixture of gases containing acetylene, acetylene homologues, carbon oxides and hydrogen which comprises cooling said gas mixture, contacting said cooled gas mixture with cold heavy naphtha in a first absorption zone to absorb acetylene homologues from said mixture, contacting overhead fraction from said first absorption zone containing acetylene, carbon oxides and hydrogen with liquid ammonia in a second absorption zone to selectively absorb acetylene, contacting bottoms fraction from said second absorption zone containing ammonia and acetylene with ammonia stripping vapors obtained as described below in a stripping zone maintained at a pressure of about 5 p.s.i.g. to about 310 p.s.i.g. to desorb acetylene, contacting overhead fraction from said stripping zone containing ammonia and acetylene with water in a scrubbing zone to scrub out ammonia, treating bottoms from said scrubbing zone containing ammonia and water in a distillation zone to recover a liquid ammonia stream, vaporizing at least a portion of said liquid ammonia stream from said distillation zone at a pressure lower than that maintained in said stripping zone in indirect heat exchange with said gas mixture to accomplish the aforesaid cooling thereof, compressing ammonia thus vaporized to a pressure at least equal to said pressure maintained in said stripping zone and introducing the compressed ammonia into said stripping zone as stripping vapors.

12. A process for recovering acetylene from a mixture of gases containing acetylene, acetylene homologues, carbon oxides and hydrogen which comprises contacting said gas mixture with cold heavy naphtha in a first absorption zone to absorb acetylene homologues from said mixture, contacting overhead fraction from said first absorption zone containing acetylene, carbon oxides and hydrogen with liquid ammonia in a second absorption zone to selectively absorb acetylene, contacting bottoms fraction from said second absorption zone containing ammonia and acetylene with ammonia stripping vapors obtained as described below in a stripping zone maintained at a pressure of about 5 p.s.i.g. to about 310 p.s.i.g. to desorb acetylene, contacting overhead fraction from said second absorption zone containing ammonia, carbon oxides and hydrogen with cold water in a scrubbing zone to scrub out ammonia, treating bottoms from said scrubbing zone containing ammonia and water in a distillation zone to recover a liquid ammonia stream and a warm water stream, vaporizing a portion of said liquid ammonia stream from said distillation zone at a pressure lower than that maintained in said stripping zone in indirect heat exchange with said heavy naphtha prior to its introduction into said first absorption zone whereby said heavy naphtha is cooled, compressing ammonia thus vaporized to a pressure at least equal to said pressure maintained in said stripping zone, introducing the compressed ammonia into said stripping zone to provide a portion of said ammonia stripping vapors, vaporizing another portion of said liquid ammonia stream from said distillation zone at a pressure higher than that maintained in said stripping zone in indirect heat exchange with at least a portion of said water stream from said distillation zone whereby the water is cooled, passing the ammonia from the last-mentioned heat exchange step to said stripping zone to provide another portion of said stripping vapors and passing said cooled water to said scrubbing zone.

13. A process for recovering acetylene from a mixture of gases containing acetylene, acetylene homologues, carbon oxides and hydrogen which comprises contacting said gas mixture with cold heavy naphtha in a first absorption zone to absorb acetylene homologues from said mixture, contacting overhead fraction from said first absorption zone containing acetylene, carbon oxides and hydrogen with liquid ammonia in a second absorption zone to selectively absorb acetylene, contacting bottoms fraction from said second absorption zone containing ammonia and acetylene with ammonia stripping vapors obtained as described below in a stripping zone maintained at a pressure of about 5 p.s.i.g. to about 310 p.s.i.g. to desorb acetylene, contacting overhead fraction from said stripping zone containing ammonia and acetylene with cold water in a first scrubbing zone to scrub out ammonia, contacting overhead fraction from said second absorption zone containing ammonia, carbon oxides and hydrogen with cold water in a second scrubbing zone to scrub out ammonia, combining bottoms fraction from each of said scrubbing zones containing ammonia and water, treating combined bottoms fraction from said scrubbing zones in a first distillation zone to recover a liquid ammonia stream and a warm water stream, treating bottoms fraction from said stripping zone containing ammonia and water in a second distillation zone to recover a liquid ammonia stream, combining the liquid ammonia streams recovered from said first and second distillation zones, vaporizing a portion of said combined ammonia stream at a pressure lower than that maintained in said stripping zone in indirect heat exchange with said heavy naphtha prior to its introduction into said first absorption zone whereby said heavy naphtha is cooled, compressing ammonia thus vaporized to a pressure at least equal to said pressure maintained in said stripping zone, introducing the compressed ammonia into said stripping zone to provide a portion of said ammonia stripping vapors, vaporizing another portion of said combined ammonia stream from the distillation zones at a pressure higher than that maintained in said stripping zone in indirect heat exchange with at least a portion of said water stream from said first distillation zone whereby the water is cooled, passing the ammonia vaporized in the last-mentioned heat exchange step to said stripping zone as stripping vapors and passing portions of said cooled water to each of said scrubbing zones.

14. A process for recovering acetylene from a mixture of gases containing acetylene, acetylene homologues, carbon oxides and hydrogen which comprises contacting said gas mixture with cold heavy naphtha in a first absorption zone to absorb acetylene homologues from said mixture, contacting overhead fraction from said first absorption zone containing acetylene, carbon oxides and hydrogen with liquid ammonia in a second absorption zone to selectively absorb acetylene, contacting bottoms fraction from said second absorption zone containing ammonia and acetylene with ammonia stripping vapors obtained as described below in a stripping zone maintained at a pressure of about 10 p.s.i.g. to about 40 p.s.i.g. to desorb acetylene, contacting overhead fraction from said stripping zone containing ammonia and acetylene with cold water in a first scrubbing zone to scrub out ammonia, contacting overhead fraction from said second absorption zone containing ammonia, carbon oxides and hydrogen with cold water in a second scrubbing zone to scrub out ammonia, combining bottoms fraction from each of said scrubbing zones containing ammonia and water, treating combined bottoms fraction from said scrubbing zones in a first distillation zone to recover a liquid ammonia stream and a warm water stream, treating bottoms fraction from said stripping zone containing ammonia and water in a second distillation zone to recover a liquid ammonia stream, combining the liquid ammonia streams recovered from first and second distillation zones, vaporizing a portion of said combined ammonia stream at a pressure lower than that maintained in said stripping zone in indirect heat exchange with said heavy naphtha prior to its introduction into said first absorption zone whereby said heavy naphtha is cooled, compressing ammonia thus vaporized to a pressure at least equal to said pressure maintained in said stripping zone, introducing the compressed ammonia into said stripping zone to provide a portion of said ammonia stripping vapors, vaporizing another portion of said combined ammonia stream from the distillation zones at a pressure higher than that maintained in said stripping zone in indirect heat exchange with at least a portion of said water stream from said first distillation zone whereby the water is cooled, passing the ammonia vaporized in the last-mentioned heat exchange step to said stripping zone to provide another portion of said stripping vapors and passing portions of said cooled water to each of said scrubbing zones.

References Cited by the Examiner

UNITED STATES PATENTS

| | | | |
|---|---|---|---|
| 2,183,148 | 12/39 | Murphree | 260—605 |
| 2,440,493 | 4/48 | Shipley | 260—679 |
| 2,741,332 | 4/56 | Finneran et al. | 183—115 |
| 2,856,258 | 10/58 | Bracoiner et al. | 23—3 |
| 3,017,442 | 1/62 | Hochgraf | 260—679 |
| 3,023,842 | 3/62 | Grover et al. | 260—677 |
| 3,026,969 | 3/62 | Braconier et al. | 260—677 |

ALPHONSO D. SULLIVAN, *Primary Examiner.*

UNITED STATES PATENT OFFICE
CERTIFICATE OF CORRECTION

Patent No. 3,199,266                            August 10, 1965

Frederick J. Quester et al.

It is hereby certified that error appears in the above numbered patent requiring correction and that the said Letters Patent should read as corrected below.

Column 3, line 26, for "voltalization" read -- volatilization --; column 8, line 52, for "19" read -- 39 --; column 9, line 63, for "naptha" read -- naphtha --; column 12, TABLE III, second column, line 15 thereof, for "0.5" read -- 1.3 --; column 16, line 9, for "steam" read -- stream --; column 18, line 7, for "Bracoiner et al." read -- Braconier et al. --.

Signed and sealed this 22nd day of February 1966.

(SEAL)
Attest:

ERNEST W. SWIDER                        EDWARD J. BRENNER
Attesting Officer                           Commissioner of Patents